US006686874B2

United States Patent
Bickert et al.

(10) Patent No.: US 6,686,874 B2
(45) Date of Patent: Feb. 3, 2004

(54) PROCESS FOR CALIBRATING RADAR SIGNALS AT SUBAPERTURES OF AN ANTENNA OF TWO-CHANNEL SAR/MTI RADAR SYSTEM

(75) Inventors: Bernhard Bickert, Ulm-Einsingen (DE); Jochen Meyer-Hilberg, Elchingen (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 10/252,005

(22) Filed: Sep. 23, 2002

(65) Prior Publication Data

US 2003/0058159 A1 Mar. 27, 2003

(30) Foreign Application Priority Data

Sep. 21, 2001 (DE) .......................... 101 46 643

(51) Int. Cl.$^7$ ................................. G01S 7/40
(52) U.S. Cl. ................. 342/174; 342/25; 342/160; 342/162; 342/192
(58) Field of Search ............... 342/25, 115, 127, 342/150–152, 155, 159–160, 162, 165, 173–174, 192, 195–196

(56) References Cited

U.S. PATENT DOCUMENTS

| | | | | |
|---|---|---|---|---|
| 3,794,998 A | * | 2/1974 | Pearson et al. ............. | 342/151 |
| 4,005,421 A | * | 1/1977 | Dax ........................... | 342/148 |
| 4,368,468 A | * | 1/1983 | Lisle et al. ................. | 342/151 |
| 4,713,666 A | * | 12/1987 | Poux .......................... | 342/152 |
| 5,051,752 A | * | 9/1991 | Woolley .................... | 342/151 |
| 5,245,347 A | | 9/1993 | Bonta et al. ................ | 342/149 |
| 6,144,333 A | | 11/2000 | Cho | |
| 6,195,045 B1 | * | 2/2001 | Xu et al. .................... | 342/368 |

OTHER PUBLICATIONS

Wang Yong–Liang et al., "Performance analysis of multiple–Doppler–channel joint processing for airborne radar", Signal Processing Proceedings, 1998 Fourth International Conference on, vol.: 2, pp.: 1540–1543.*
Stjernman A. et al., "Dual–channel and multifrequency radar system calibration,Geoscience and Remote Sensing", IEEE Transactions on , vol.: 33 Issue 2 Mar. 1995, pp.: 325–330.*

(List continued on next page.)

Primary Examiner—Thomas H. Tarcza
Assistant Examiner—Isam Alsomiri
(74) Attorney, Agent, or Firm—Crowell & Moring LLP

(57) ABSTRACT

In a process for computing the radar signals present at the output of two subapertures of an antenna of a two-channel radar system, the two subaperture channels are combined by means of a wave guide part to a sum and difference channel, and the signals of the sum and difference channel are used to compute the radar signals at the subaperture channels. The signals of the two subaperture channels are computed from the amplitude- and phase-shifted sum and difference channel signal by being placed in the following equations:

$$X_1(r, f) = \frac{X_S(r, f) - X_D(r, f) \cdot \exp(-j\Phi_0)}{2} \quad (1)$$

$$X_2(r, f) = a_0 \cdot \left( \frac{X_S(r, f) + X_D(r, f) \cdot \exp(-j\Phi_0)}{2} \right) \quad (2)$$

wherein $X_1(r,f)$, $X_2(r,f)$: Frequency spectrum of the two subaperture channels; $X_S(r,f), X_D(r,f)$: Frequency spectrum of the sum and difference channel, r: distance cell, f: Doppler frequency, $\Phi_0$: phase correction factor, and $a_0$: amplitude correction factor.

4 Claims, 3 Drawing Sheets

OTHER PUBLICATIONS

Wang, Y.-L. et al., "Space–time adaptive processing for airborne radar with various array□□orientations", Radar, Sonar and Navigation, IEEE Proceedings, vol.: 144 Issue: 6, Dec. 1997, pp.: 330–340.*

Shunjun Wu et al., Adaptive channel equalization for space–time adaptive processing, Radar Conference, 1995., Record of the IEEE 1995 International , May 8–11, 1995, pp.: 624–628.*

Shunjun Wu, et al., "Adaptive Channel Equalization for Space–Time Adaptive Processing" Record of the IEEE 1995 International Radar Conference Proceedings International Radar Conference, May 8–11, 1995.

Search Report

* cited by examiner

PROCESS FOR CALIBRATING RADAR SIGNALS AT SUBAPERTURES OF AN ANTENNA OF TWO-CHANNEL SAR/MTI RADAR SYSTEM

BACKGROUND AND SUMMARY OF THE INVENTION

This application claims the priority of 101 46 643.9, filed Sep. 21, 2001, the disclosure of which is expressly incorporated by reference herein.

The invention relates to a process of calibrating the radar signals at the subapertures of the antenna of a two-channel SAR (Synthetic Aperture)/MTI (Moving Target Indication) radar system.

In a two-channel radar system, the two subaperture channels (1, 2) of an antenna (A), in the antenna front end, can be combined by means of a wave guide element (T) (normally a so-called MagicT), to a sum channel ($\Sigma$) and a difference ($\Delta$) channel, in a known manner. Such an arrangement is illustrated in FIG. 1, which also shows that the sum ($\Sigma$) and difference ($\Delta$) channel signals are fed to analog and digital signal processors (AS, DS).

In the digital signal processing of an SAR radar, the sum channel signal is used to establish so-called radar ground maps. In the digital signal processing of an MTI radar, the sum channel signal is used to detect and indicate moving targets in images similar to radar ground maps. For this purpose, FIG. 2 shows a typical distance Doppler image in the sum channel after the detection of fixed and moving targets generated by means of the MTI method. In this case, the signal powers are shown with respect to the distance gates and the normalized frequency $f/f_s$. As can be seen, the area of the antenna spot (light area), also called the major lobe clutter, is shifted with respect to the zero Doppler frequency position because of a relative geometry change during the illumination time. The circles illustrated in the picture indicate the detected fixed and moving targets. In FIG. 2, the Doppler frequency position of the major lobe clutter is, for example, at a normalized frequency of 0.2.

While, in SAR radar signal processing, the difference channel signal is not used any further, in the corresponding MTI radar signal processing, the difference channel signal is required, on the one hand, to separate fixed and moving targets and, on the other hand, to reposition the moving targets shifted with respect to the Doppler frequency.

One method for the fixed target suppression is known as STAP (Space Time Adaptive Processing) method. In order to maximize moving target suppression, the subaperture channel signals must be exactly identical in amplitude and, differ in phase only by a value caused by the relative geometry and antenna arrangement. For moving target repositioning, it is also necessary to compensate various phase differences between the subaperture channel signals which result in faulty positioning. A conventional method of determining the compensation factors of the amplitude and the phase is to use defined test signals which are fed into the wave guide element, or are irradiated by way of the antenna. This takes place before the actual use of the radar antenna. The sum and difference channel signals behind the wave guide part are then computed back into the input signals in front of the wave guide part, and thus into the signals of the two subaperture channels. If the correction factors were determined correctly, the two signals will be identical. The factors are filed in the memory of the digital signal processing and, during the use of the radar antenna, are read out of this memory. Such a method was described by Shunjun W. et al. in "Adaptive Channel Equalization for Space-Time Adaptive Processing"; IEEE International Radar Conference 1995.

The computation of the signals of the subaperture channels normally takes place according to the following equations:

$$x_1(t) = \frac{x_s(t) - x_d(t)}{2} \quad (a)$$

$$x_2(t) = \frac{x_s(t) + x_d(t)}{2} \quad (b)$$

wherein $x_1(t)$, $x_2(t)$: time signal of the two subaperture channels, $x_s(t)$, $x_d(t)$: time signal sum and difference channel.

In this case, it is disadvantageous that this method of operation has to be implemented beforehand. Moreover, the amplitude and phase tracking differences which occur during the running operation can no longer be corrected. It is also a disadvantage that testing signals have to be fed in the running operation, which leads to higher expenditures and to a possible interruption of the coherent digital signal processing.

It is an object of the invention to provide an improved process for computing the sum and difference channel signal back to the signal existing at the output of the two subapertures.

Another object of the invention is to provide a process which does not require a test signal, during the running operation; adaptively computes the correction factors from the radar signals for generating the picture; and carries out the correction.

These and other objects and advantages are achieved by the calibration process according to the invention, in which the signals of the two subaperture channels are computed from the amplitude- and phase-shifted sum and difference channel signal according to the following equations:

$$X_1(r, f) = \frac{X_S(r, f) - X_D(r, f) \cdot \exp(-j\Phi_0)}{2} \quad (1)$$

$$X_2(r, f) = a_0 \cdot \left( \frac{X_S(r, f) + X_D(r, f) \cdot \exp(-j\Phi_0)}{2} \right) \quad (2)$$

wherein $X_1(r,f)$, $X_2(r,f)$: Frequency spectrum of the two subaperture channels, $X_S(r,f)$, $X_D(r,f)$: Frequency spectrum of the sum and difference channel, r: distance cell, f: Doppler frequency, $\Phi_0$: phase correction factor, $a_0$: amplitude correction factor.

By means of the phase correction factor $\Phi_0$, the phase difference is determined between the sum and difference channel.

Other objects, advantages and novel features of the present invention will become apparent from the following detailed description of the invention when considered in conjunction with the accompanying drawings.

DETAILED DESCRIPTION OF THE DRAWINGS

Figure 1:
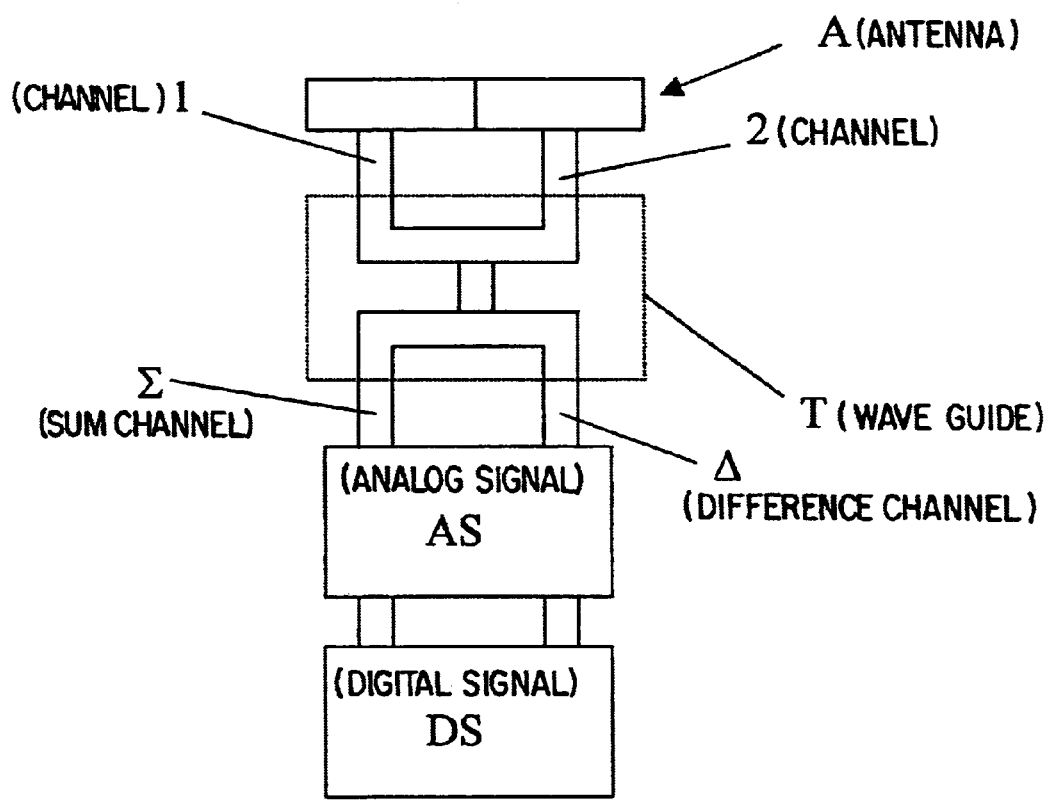
FIG. 1 is a block diagram which shows the structure of a two channel radar system after the two subapertures in the front end to the digital signal processing.

For estimating the phase correction factor $\Phi_0$, the following computation steps are carried out in an advantageous embodiment of the invention:

computing the Doppler frequency position of the major lobe clutter, correcting the sum and difference channel signal $X_S(r,t)$, $X_D(r,t)$, wherein, for each of the various distance gates in the phase, the sum and difference channel signal is shifted as a function of the pulse repetition time into the frequency zero position, filtering the sum and difference channel signals shifted into the zero position, by means of a low pass filter for suppressing high-frequency phase noise, reducing the scanning rate of the sum and difference channel signals to reduce the computing power and increase the spectral resolution, transforming the filtered sum and difference channel signals $X_S(r,t)$, $X_D(r,t)$ via a windowed Fast Fourier transformation (FFT) into the Doppler frequency range, for each Doppler frequency position computing the cross-correlation of the sum and difference channel signals $X_S(r,f)$, $X_D(r,f)$ by way of the various distance gates, determining the course of the phase difference between the sum and difference channel $X_S(r,f)$, $X_D(r,f)$ from the correlations computed in the preceding step, by way of the frequency range adaptively computed in the first step, and determining the phase correction factor $\Phi_0$ by computing the arithmetic mean value of the phase difference between the sum and difference channel by way of the frequency range of the major lobe clutter adaptively computed in the first step.

The range of the highest energy in the sum and difference channel MTI picture (particularly the range of the major lobe of the antenna) is preferably used to determine the phase correction value $\Phi_0$.

In this case, the Doppler frequency position of the major lobe clutter in the first computation step can be computed using a known method, such as described in German patent document DE 101 24 865.2 (not prior art). According to the invention, this range is adaptively estimated from the radar data.

The correction of the sum and difference channel signals $X_S(r,t)$, $X_D(r,t)$ in the second step is a so-called deramping process. A displacement of the sum and difference channel signal is carried out for each of the various distance gates in the phase as a function of the pulse repetition time t into the frequency zero position. This takes place according to the following equation:

$$X_S(r,t) = X_S(r,t) \cdot \exp(-j\Phi_{Clutter}) \quad (3)$$

wherein $\Phi_{clutter}$: pertaining phase of the median spectral major lobe clutter position.

As soon as the sum and difference channel signals have been shifted into the frequency zero position, they are advantageously low-pass filtered (in the third step) to suppress high-frequency phase noise. As a result, the bandwidth of the signals is also reduced, which is used for carrying out a reduction of the number of signal values—a so-called scanning rate reduction. This advantageously results in turn in a reduction of the computation time while the spectral resolution is the same, or advantageously in an increase of the spectral resolution while the number of the reduced signal values is increased. The scanning rate reduction is carried out in the fourth computation step.

Within a distance cell, several point targets, of differing amplitude and phase, are situated in the sum and difference channel time signals. However, these cannot be resolved in the time signal. Advantageously, therefore, in a fifth and sixth step, the filtered sum and difference channel signals are transformed into the spectral range (the so-called Doppler frequency range), for example, using a windowed Fast Fourier Transformation (FFT), so that the individual point targets can be differentiated with respect to their frequency (that is, the time derivative of the phase).

In this case, an FFT may be considered to be an arrangement of several frequency subbands, each frequency subband having a stop-band attenuation of approximately 14 dB, corresponding to pulse response of a rectangular window. This means that amplitudes of the adjacent frequency band with an attenuation of approximately 14 dB can also pass through. If the time signals are advantageously windowed by means of a window function of a high stop-band attenuation, an almost genuine spectral signal is obtained in each frequency band.

By means of the windowed FFT, the distance-time (slow time) pictures have become distance—Doppler frequency images. For each Doppler frequency position, in the sixth step, the sum and difference channel as a function over the individual distance gates is mutually cross-correlated. This means that the complex vectors of the signals are multiplied with one another and added up, yielding a complex value for each Doppler frequency position. This complex value has a real part Re and an imaginary part Im. The phase of this value is computed in the degree unit from:

$$\Phi = \tan^{-1}\left(\frac{\text{Im}}{\text{Re}}\right)\frac{180}{\pi}.$$

In the following, this phase is called the difference phase.

Figure 2:
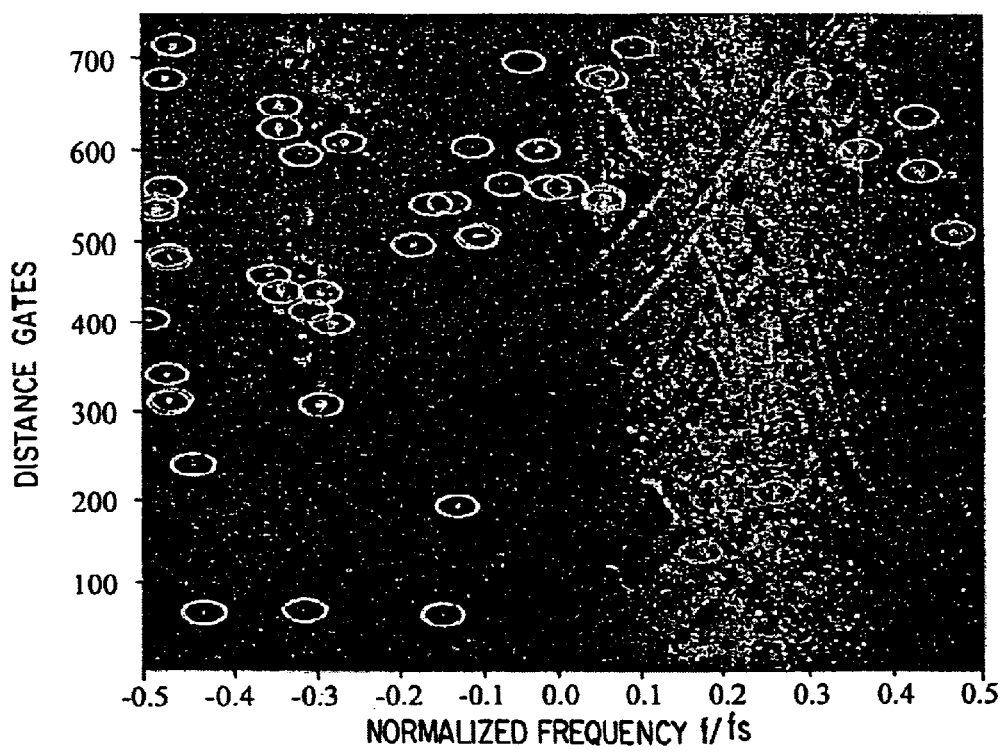
FIG. 2 shows an example of a distance Doppler image in the sum channel after the detection of the fixed/moving targets.
Figure 3:
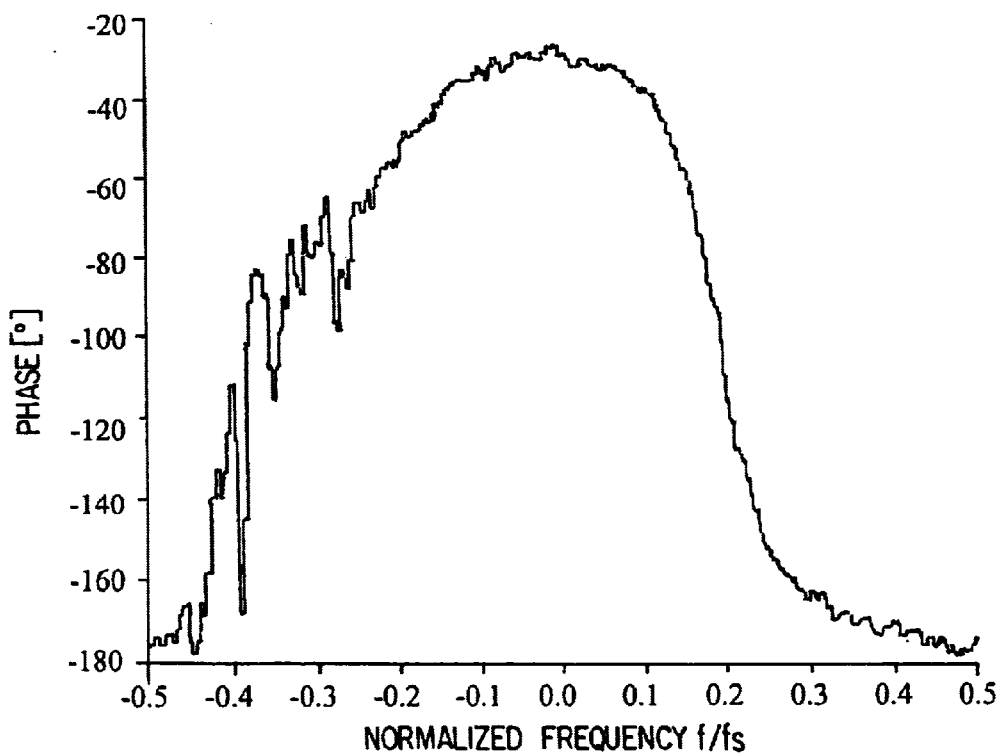
FIG. 3 is a view of the course of the phase difference between the sum and the difference channel over the normalized frequency in the manner of an example.

In a seventh step, the computation of the phases for each Doppler frequency position then results in a course which indicates the phase difference between the sum and difference channel spectrum. FIG. 3 shows an example of the course of phase difference between the sum and difference channel spectrum in the major lobe clutter range, with the Doppler frequency position of the major lobe clutter corresponding to FIG. 2 being at 0.2. Thus, FIG. 3 illustrates for this example, a phase difference of −110° between the sum and difference channel spectrum for the mean Doppler frequency position of the major lobe clutter. This phase difference, which as a function of the construction of the waveguide element (MagicT), may amount, for example, to 90°, is corrected by means of the phase correction factor $\Phi_0$ in the spectrum according to the invention.

Figure 4:
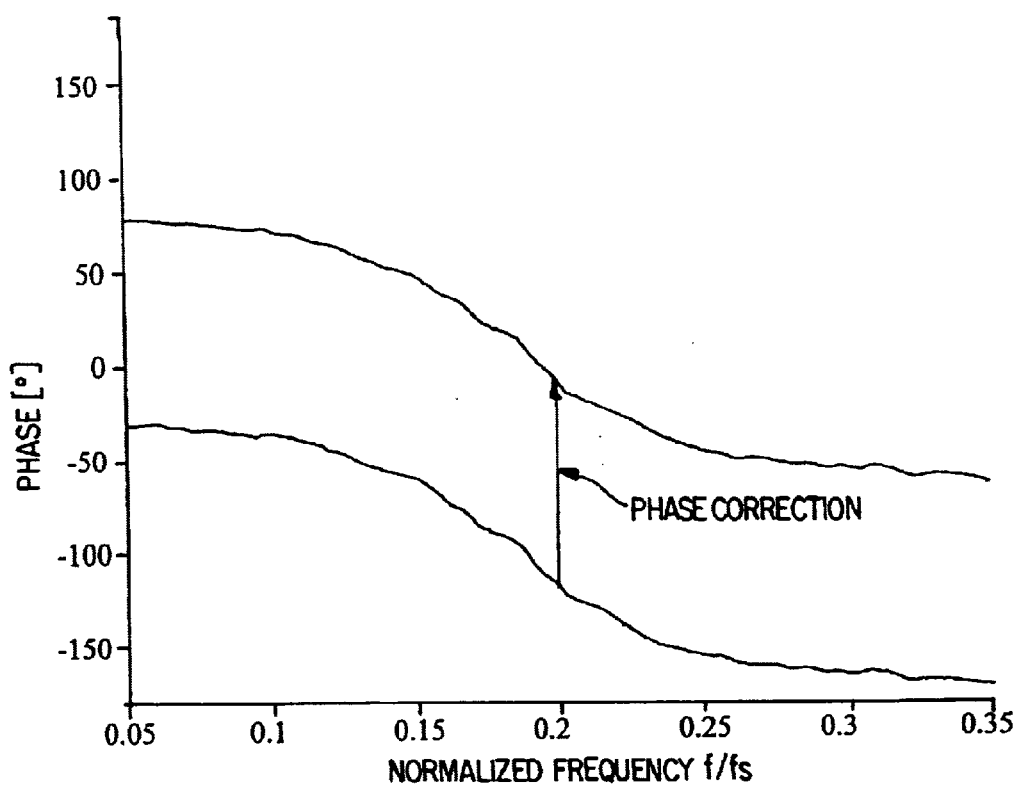
FIG. 4 is a view of the course of the phase difference according to FIG. 3 in a cutout around the Doppler frequency position of the major lobe clutter, as well as the course of the phase difference between the sum and difference channel after the phase correction.

To determine the phase correction factor $\Phi_0$, in the eighth computation step, the arithmetic mean value of the difference phase values will then be computed within the Doppler frequency position range of the major lobe clutter determined in the first computation step. This mean value corresponds to the phase correction factor $\Phi_0$. FIG. 4 shows an enlarged cutout around the Doppler frequency position of the major lobe clutter of FIG. 3. In addition, another curve is entered which corresponds to the course of the phase difference between the sum and difference channel spectrum corrected by the phase correction factor $a_0$. This corrected curve has a phase difference of 0° between the sum and difference channel spectrum at the Doppler frequency position of the major lobe clutter.

In another advantageous embodiment of the invention, the amplitude correction factor $a_0$ is estimated by means of the following steps:

computing the spectra for the two subaperture channels according equations (1) and (2) with $a_0=1$;

computing one mean power density spectrum respectively for one and the other subaperture channel by taking the geometric mean of the subaperture channel spectra computed in equation (1) and (2) over different distance gates;

computing the difference of the power density spectra between the subaperture channel power density spectra averaged over various distance gates; and determining the amplitude correction factor $a_0$ by computing the arithmetic mean value of the difference over the frequency range of the major lobe clutter adaptively computed in step 1 of the phase correction computation.

In the first step, by means of the estimated phase correction factor $\Phi_0$, the frequency spectra for the two subaperture channels are determined according to equations (1) and (2), the amplitude correction factor $a_0$ being set to 1. In the second and third steps, the power density spectra are computed from the complex frequency spectra, and their geometric mean is taken advantageously by way of a definable selection of the distance gates; that is, the mean value of the logarithmized powers is computed.

Figure 5:
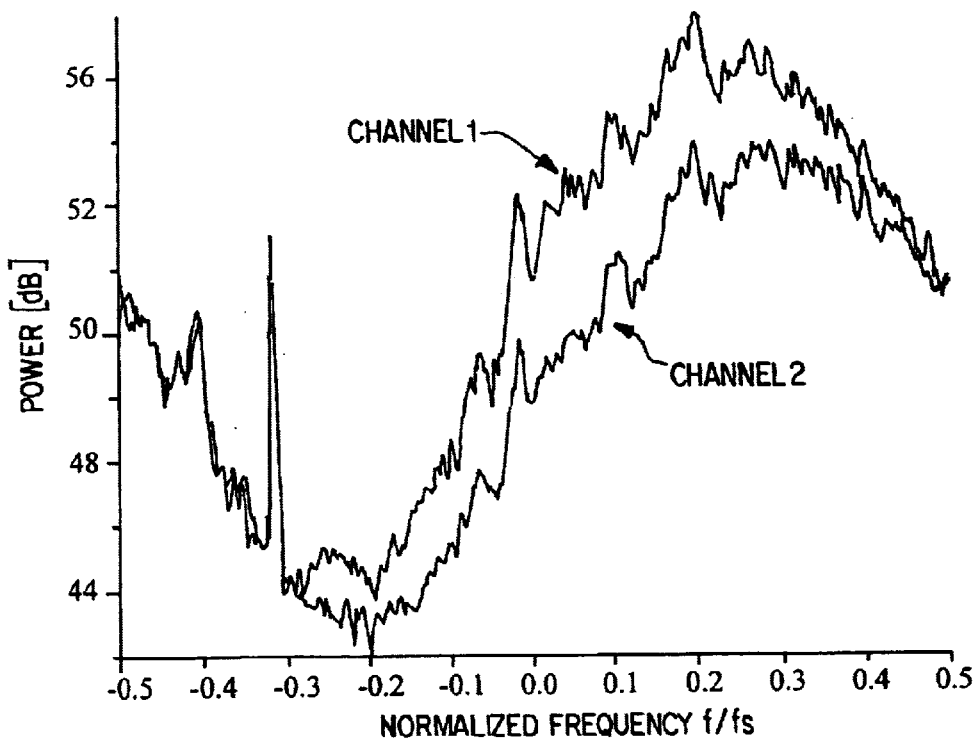
FIG. 5 is a view of the course of the signal powers of the two subaperture channels over the normalized frequency.

FIG. 5 illustrates an example of the course of the power density spectra of the two subaperture channels (channel 1 and channel 2) over the normalized frequency $f/f_s$. Since, in the first computation step, the amplitude correction factor amounts to $a_0=1$, the courses of the curves of the two power density spectrums deviate from one another.

In the fourth step, the geometric mean value is determined of the difference of the averaged power density spectra within the Doppler frequency position range of the major lobe clutter.

The amplitude correction factor $a_0$ estimated in the second, third and fourth steps therefore indicates the amount by which the power density spectra of the two subaperture spectra constantly deviate from one another, at least in the range of the major lobe clutter.

In another advantageous embodiment of the invention, the estimated constant phase and amplitude correction factors are stabilized recursively from one signal pulse packet to the next. In this case, a frequency distribution of the estimated values in computed and the value of the greatest frequency is continued to be used as the estimated value.

One advantage of the invention is that the sum and difference channel can be computed by means of digital signal processing back into the individual channels of the subaperture without having to make changes at the antenna (front end). These computations take place during the usual operation of the antenna without having to interrupt the coherent signal processing.

Another significant advantage of the invention is that no test signal is required for the computation; which is based on the radar data themselves. In addition, the process according to the invention has very good results even in the case of a poor signal-to-noise ratio.

It is another advantage that no knowledge of the synchronization characteristics of the channels is required for the process according to the invention. If synchronization differences of the channels are time-dependent, this is taken into account by the adaptivity of the process according to the invention in that the process is used in each nth computation step, and the estimated values of the highest probability are used.

The process according to the invention can also be applied to other signals with the exception of radar signals.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for computing radar signals present at subapertures of an antenna of a two-channel radar system, comprising:

combining two subaperture channels by means of a wave guide element to form a sum and difference channel; and using signals of the sum and difference channel to compute the radar signals at the subaperture channels; wherein, the signals of the two subaperture channels are computed from amplitude- and phase-shifted sum and difference channel signal according to the relation $$X_1(r, f) = \frac{X_S(r, f) - X_D(r, f) \cdot \exp(-j\Phi_0)}{2} \quad (1)$$

$$X_2(r, f) = a_0 \cdot \left(\frac{X_S(r, f) + x_D(r, f) \cdot \exp(-j\Phi_0)}{2}\right) \quad (2)$$

$X_1(r,f)$, $X_2(r,f)$ are frequency spectra of the two subaperture channels;

$X_S(r,f)$, $X_D(r,f)$ are frequency spectra of the sum and difference channel;

r is the distance cell;

f is the Doppler frequency;

$\Phi_0$ is the phase correction factor; and $a_0$ is the amplitude correction factor.

2. The process according to claim 1, wherein the phase correction factor $\Phi_0$ is estimated by a process comprising:

computing the Doppler frequency position of the major lobe clutter;

correcting the sum and difference channel signal, wherein, for each of the various distance gates in the phase, the sum and difference channel signal is shifted as a function of the pulse repetition time into the frequency zero position;

filtering corrected sum and difference channel signals via a low pass filter for suppressing high-frequency phase noise;

reducing a scanning rate of the sum and difference channel signal to reduce processing time and increase spectral resolution;

transforming the filtered sum and difference channel signal $X_S(r,t)$, $X_D(r,t)$ via a windowed Fast Fourier transformation (FFT) into a Doppler frequency range;

for each Doppler frequency position, computing a cross-correlation of the sum and difference channel signal $X_S(r,f)$, $X_D(r,f)$ by way distance gates;

determining a course of a phase difference between the sum and difference channel signals $X_S(r,f)$, $X_D(r,f)$ from said cross-correlations, by way of an adaptively computed frequency range; and determining a phase correction factor $\Phi_0$ by computing the arithmetic mean value of the phase difference between the sum and difference channel by way of a frequency range of said major lobe clutter.

3. The process according to claim 1, wherein the amplitude correction factor $a_0$ is estimated by a process comprising:

computing spectra for the two subaperture channels according equations (1) and (2) with $a_0=1$;

computing a mean spectrum for one and the other subaperture channel by taking the geometric mean of the spectra computed in equation (1) and (2) over different distance gates;

computing a mean difference spectrum from the mean spectrum of one and the other subaperture channel;

determining the amplitude correction factor $a_0$ as an arithmetic mean value of a difference over the frequency range of said major lobe clutter of the phase correction computation.

4. The process according to claim 1, wherein:

estimation takes place on the basis of a packet of signal pulses;

a frequency distribution of the estimated values is computed for each pulse packet; and a value with a greatest frequency is used as the estimated value.

* * * * *